United States Patent
Taylor et al.

(10) Patent No.: US 9,373,185 B2
(45) Date of Patent: *Jun. 21, 2016

(54) INTERACTIVE DESIGN, SYNTHESIS AND DELIVERY OF 3D MOTION DATA THROUGH THE WEB

(71) Applicant: Adobe Systems Incorporated, San Jose, CA (US)

(72) Inventors: Graham Taylor, Toronto (CA); Stefano Corazza, San Francisco, CA (US); Nazim Kareemi, Palo Alto, CA (US); Edilson de Aguiar, El Cerrito, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 14/257,729

(22) Filed: Apr. 21, 2014

(65) Prior Publication Data

US 2014/0313207 A1 Oct. 23, 2014

Related U.S. Application Data

(63) Continuation of application No. 12/370,269, filed on Feb. 12, 2009, now Pat. No. 8,704,832.

(60) Provisional application No. 61/192,779, filed on Sep. 20, 2008.

(51) Int. Cl.
*G06T 13/00* (2011.01)
*G06T 13/40* (2011.01)

(52) U.S. Cl.
CPC ............... *G06T 13/40* (2013.01); *G06T 13/00* (2013.01); *G06T 2200/16* (2013.01)

(58) Field of Classification Search
USPC .......................................... 345/419, 473, 474
See application file for complete search history.

(56) References Cited

U.S. PATENT DOCUMENTS

| 4,797,836 A | 1/1989 | Witek et al. |
| 6,047,078 A | 4/2000 | Kang |

(Continued)

FOREIGN PATENT DOCUMENTS

| EP | 1884896 | 2/2008 |
| WO | WO 01/39130 | 5/2001 |

(Continued)

OTHER PUBLICATIONS

Keith Grochow et al. "Style-Based Inverse Kinematics". Published 2004.*

(Continued)

*Primary Examiner* — Kimbinh T Nguyen
(74) *Attorney, Agent, or Firm* — Keller Jolley Preece (57) ABSTRACT

Systems and methods are described for animating 3D characters using synthetic motion data generated by generative models in response to a high level description of a desired sequence of motion provided by an animator. In a number of embodiments, an animation system is accessible via a server system that utilizes the ability of generative models to generate synthetic motion data across a continuum to enable multiple animators to effectively reuse the same set of previously recorded motion capture data to produce a wide variety of desired animation sequences. One embodiment of the invention includes a server system configured to communicate with a database containing motion data including repeated sequences of motion, where the differences between the repeated sequences of motion are described using at least one high level characteristic. In addition, the server system is configured to train a generative model using the motion data, the server system is configured to generate a user interface that is accessible via a communication network, to receive a high level description of a desired sequence of motion via the user interface, to use the generative model to generate synthetic motion data based on the high level description of the desired sequence of motion and to transmit a stream via the communication network including information that can be used to display a 3D character animated using the synthetic motion data.

21 Claims, 4 Drawing Sheets

(56) References Cited

U.S. PATENT DOCUMENTS

| | | | |
|---|---|---|---|
| 6,088,042 A | 7/2000 | Handelman et al. | |
| 6,278,466 B1 | 8/2001 | Chen | |
| 6,462,742 B1 | 10/2002 | Rose | |
| 6,552,729 B1* | 4/2003 | Di Bernardo | G06T 13/20 345/473 |
| 6,554,706 B2 | 4/2003 | Kim et al. | |
| 6,700,586 B1 | 3/2004 | Demers | |
| 6,714,200 B1* | 3/2004 | Talnykin | G06T 13/20 345/473 |
| 7,168,953 B1* | 1/2007 | Poggio | G06T 13/205 345/473 |
| 7,209,139 B1 | 4/2007 | Keet et al. | |
| 7,522,165 B2 | 4/2009 | Weaver | |
| 7,937,253 B2 | 5/2011 | Anast et al. | |
| 8,704,832 B2 | 4/2014 | Taylor et al. | |
| 8,749,556 B2 | 6/2014 | Aguiar et al. | |
| 8,797,328 B2 | 8/2014 | Corazza et al. | |
| 8,928,672 B2 | 1/2015 | Corazza et al. | |
| 2002/0050988 A1 | 5/2002 | Petrov et al. | |
| 2003/0164829 A1 | 9/2003 | Bregler et al. | |
| 2003/0169907 A1 | 9/2003 | Edwards et al. | |
| 2003/0208116 A1 | 11/2003 | Liang et al. | |
| 2003/0215130 A1 | 11/2003 | Nakamura et al. | |
| 2004/0021660 A1 | 2/2004 | Ng-Thow-Hing et al. | |
| 2004/0049309 A1 | 3/2004 | Gardner et al. | |
| 2004/0210427 A1 | 10/2004 | Marschner et al. | |
| 2004/0227752 A1 | 11/2004 | McCartha et al. | |
| 2005/0264572 A1 | 12/2005 | Anast et al. | |
| 2006/0002631 A1 | 1/2006 | Fu et al. | |
| 2006/0109274 A1 | 5/2006 | Alvarez et al. | |
| 2006/0134585 A1 | 6/2006 | Adamo-Villani et al. | |
| 2006/0171590 A1 | 8/2006 | Lu et al. | |
| 2006/0245618 A1 | 11/2006 | Boregowda et al. | |
| 2006/0267978 A1 | 11/2006 | Litke et al. | |
| 2007/0091085 A1 | 4/2007 | Wang et al. | |
| 2007/0104351 A1 | 5/2007 | Yang et al. | |
| 2007/0182736 A1 | 8/2007 | Weaver | |
| 2008/0024487 A1 | 1/2008 | Isner et al. | |
| 2008/0030497 A1 | 2/2008 | Hu et al. | |
| 2008/0031512 A1 | 2/2008 | Mundermann et al. | |
| 2008/0043021 A1 | 2/2008 | Huang et al. | |
| 2008/0152213 A1 | 6/2008 | Medioni et al. | |
| 2008/0158224 A1 | 7/2008 | Wong et al. | |
| 2008/0170077 A1* | 7/2008 | Sullivan | G06T 13/40 345/473 |
| 2008/0180448 A1 | 7/2008 | Anguelov et al. | |
| 2008/0187246 A1 | 8/2008 | Andres Del Valle | |
| 2008/0252596 A1 | 10/2008 | Bell et al. | |
| 2009/0027337 A1 | 1/2009 | Hildreth | |
| 2009/0067730 A1 | 3/2009 | Schneiderman | |
| 2009/0195544 A1 | 8/2009 | Wrinch | |
| 2009/0196466 A1 | 8/2009 | Capata et al. | |
| 2009/0231347 A1 | 9/2009 | Omote | |
| 2010/0020073 A1 | 1/2010 | Corazza et al. | |
| 2010/0073361 A1 | 3/2010 | Taylor et al. | |
| 2010/0134490 A1 | 6/2010 | Corazza et al. | |
| 2010/0149179 A1 | 6/2010 | Aguiar et al. | |
| 2010/0253703 A1 | 10/2010 | Ostermann | |
| 2010/0259547 A1 | 10/2010 | de Aguiar et al. | |
| 2010/0278405 A1 | 11/2010 | Kakadiaris et al. | |
| 2010/0285877 A1 | 11/2010 | Corazza | |
| 2011/0292034 A1 | 12/2011 | Corazza et al. | |
| 2012/0019517 A1 | 1/2012 | Corazza et al. | |
| 2012/0038628 A1 | 2/2012 | Corazza et al. | |
| 2013/0021348 A1 | 1/2013 | Corazza et al. | |
| 2013/0127853 A1 | 5/2013 | Corazza | |
| 2013/0215113 A1 | 8/2013 | Corazza et al. | |
| 2013/0235045 A1 | 9/2013 | Corazza et al. | |
| 2014/0204084 A1 | 7/2014 | Corazza et al. | |
| 2014/0285496 A1 | 9/2014 | de Aguiar et al. | |
| 2014/0313192 A1 | 10/2014 | Corazza et al. | |

FOREIGN PATENT DOCUMENTS

| | | |
|---|---|---|
| WO | WO/2007/132451 | 11/2007 |
| WO | WO 2007/132451 | 11/2007 |
| WO | WO 2009/007701 | 1/2009 |
| WO | WO/2009/007701 | 1/2009 |
| WO | WO 2010/060113 | 5/2010 |
| WO | WO/2010/060113 | 5/2010 |
| WO | WO 2010/129721 | 11/2010 |
| WO | WO/2010/129721 | 11/2010 |
| WO | WO/2011/123802 | 10/2011 |
| WO | WO 2011/123802 | 10/2011 |
| WO | WO/2012/012753 | 1/2012 |
| WO | WO 2012/012753 | 1/2012 |

OTHER PUBLICATIONS

International Search Report for International Application No. PCT/US09/57155, date completed Dec. 22, 2009, date mailed Jan. 12, 2010, 5 pgs.

Written Opinion of the International Searching Authority for International Application No. PCT/US09/57155, date completed Dec. 22, 2009, date mailed Jan. 12, 2010, 6 pgs.

International Search Report for International Application No. PCT/US09/65825, date completed Jan. 21, 2010, date mailed Jan. 28, 2010, 3 pgs.

Written Opinion of the International Searching Authority for International Application No. PCT/US09/65825, date completed Jan. 21, 2010, date mailed Jan. 28, 2010, 6 pgs.

International Search Report for International Application PCT/US2011/045060, completed Nov. 27, 2011, 2 pgs.

International Search Report for PCT/US2010/033797, filed May 5, 2010, report completed Jun. 11, 2010, 2 pgs.

Written Opinion of the International Searching Authority for International Application No. PCT/US2010/033797, filed May 5, 2010, completed Jun. 11, 2010, 4 pgs.

Written Opinion of the International Searching Authority for International Application No. PCT/US2011/045060, completed Nov. 27, 2011, 5 pgs.

Aguiar, E. De et al., "Automatic Conversion of Mesh Animations into Skeleton-based Animations", Eurographics 2008, Apr. 2008, 9 pgs.

Anguelov et al., "SCAPE: Shape Completion and Animation of People", Proceedings of the SIGGRAPH Conference, 2005.

Anguelov et al., "The Correlated Correspondence Algorithm for Unsupervised Registration of Nonrigid Surfaces" Advance in Neural Information Processing Systems, 2005, 17, 33-40.

Baran, et al., "Automatic rigging and animation of 3D characters", ACM Transactions on Graphics (TOG)—Proceedings of ACM SIGGRAPH 2007, vol. 26 Issue 3, Jul. 2007.

Beaudoin, et al., "Adapting Wavelet Compression to Human Motion Capture Clips", GI '07 Proceedings of Graphics Interface, 2007, 6 pages.

Blanz et al., "A Morphable Model for the Synthesis of 3D Faces", In Proceedings of ACM SIGGRAPH 1999, 8pgs.

Blanz, et al., "Reanimating Faces in Images and Video", Computer Graphics forum. vol. 22, No. 3. Blackwell Publishing, Inc., 2003, 10 pages.

Bray, Joseph, "Markerless Based Human Motion Capture: A Survey", Published 2001, 44 pgs.

Buenaposada et al. "Performance driven facial animation using illumination independent appearance-based tracking." IEEE, 2006.

Cheung et al., "Shape-from Silhouette of Articulated Objects and its use for Human Body Kinematics Estimation and Motion Capture", In Conference on Computer Vision and Pattern Recognition (CVPR), pp. 77-84, 2003.

Curio et al. "Semantic 3D Motion Retargeting for Facial Animation", ACM 2006.

Curless et al., "The Space of Human Body Shapes: Reconstruction and Parameterization form Range Scans", ACM Transactions on Graphics, 22(3), pp. 587-594., 2003.

Curless et al., "A Volumetric Method of Building Complex Models from Range Images", Proceedings of SIGGRAPH 1996, pp. 302-312, 1996.

(56) References Cited

OTHER PUBLICATIONS

Curless et al., "A Volumetric Method of Building Complex Models from Range Images", Retrieved from http://graphics.stanford.edu/papers/volrange.pdf, pp. 1-10, 1996.
Davis et al., "Filing Holes in Complex Surfaces Using Volumetric Diffusion", Symposium on 3D Data Processing, Visualization, and Transmission, 2002.
De Aguiar et al., "Marker-Less 3D Feature Tracking for Mesh-Based Human Motion Caption", Human Motion 2007, LNCS 481 8, 2007, 15 pgs.
Di Bernardo et al., "Generating Realistic Human Motions from Observations", submitted to Fifth European Conf. on Computer Vision, ECCV 1998, pp. 1-12.
Gao et al., "Motion normalization: the preprocess of motion data", 2005, pp. 253-256.
Garland et al., "Surface Simplification Using Quadric Error Metrics", Proceedings of SIGGRAPH 1997, pp. 209-216, 1997.
Goncalves et al., Reach Out and Touch Space (Motion Learning), Automatic Face and Gesture Recognition, 1998. Proceedings. Third IEEE International Conference on Apr. 14-16, 1998, pp. 234-239.
Grassia, "Believable Automatically Synthesized Motion by Knowledge-Enhanced Motion Transformation", Thesis CMU-CS-00-163 in Aug. 21, 2000.
Hahnel et al., "An Extension of the ICP Algorithm for Modeling Nonrigid Objects with Mobile Robots", Proceedings of the International Joint Conference on Artificial Intelligence (IJCAI), 6 pgs., 2003.
Hilton et al., "From 3D Shape Capture to Animated Models", First International Symposium on 3D Processing, Visualization and Transmission (3DVPT2002), pp. 246-255, 2002.
Ju, et al., "Reusable Skinning Templates Using Cage-basedDeformations", ACM Transactions on Graphics (TOG)—Proceedings ofACM SIGGRAPH Asia 2008, vol. 27 Issue 5, Dec. 2008, 10 pages.
Kahler et al., "Head shop: Generating Animated Head Models with Anatomical Structure.", ACM SIGGRAPH Symposium on Computer Animation, pp. 55-64, 2002.
Lewis, "H.264IMPEG-4 AVC CABAC overview", http://www.theonlineoasis.co.uk/notes.html, Dec. 3, 2012.
Lewis et al., "Pose Space Deformation: A Unified Approach to Shape Interpolation and Skeleton-Drive Deformation", Proceedings of ACM SIGGRAPH 2000, pp. 165-172, 2000.
Liepa, P., "Filing Holes in Meshes", Proc. of the Eurographics/ACM SIGGRAPH Symposium on Geometry Processing, pp. 200-205, 2003.
Ma et al., "An Invitation to 3D Vision", Springer Verlag, pp. 15-28, 2004.
Mamou et al., "Temporal DCT-based compression of 3D dynamic meshes", ICCOM'06 Proceedings of the 10th WSEAS international conference on Communications, 2006, pp. 74-79.
Mamou et al., "The New MPEG-4/FAMC Standard for Animated 3D Mesh Compression", IEEE 3DTV-CON'08, May 2008.
Max Planck Institut Informatik, "Automatic Conversion of Mesh Animations into Skeleton-based Animations", Retrieved at: http://www.mpiinf.mpg.def/-edeaguia/animation_eg08.html, Mar. 30, 2008, 9 Pgs.
Noh et al., "Expression Cloning", Proceedings of ACM SIGGRAPH 2001, pp. 277-288, 2001.
Okada, R., et al., "A Video Motion Capture System for Interactive Games", MVA2007 IAPR Conference on Machine Vision Applications, May 16-18, 2007, Tokyo, Japan, 4 pgs.
Park et al., "On-line locomotion generation based on motion blending", ACM SIGGRAPH Symposium on Computer Animation. San Antonio, Jul. 21, 2002, pp. 105-111.
Park et al., "On-line motion blending for real-time locomotion generation", Computer Animation &Virtual Worlds Wiley, UK vol. 15, No. 3-4, Jul. 2004, pp. 125-138.
Popovic et al., "Style-Based Inverse Kinematics", ACM Transactions n Graphics, 23(3), pp. 522-531, 2004.
Safonova et al., "Construction and optimal search of interpolated motion graphs", ACM SIGGRAPH, 2007, 11 pgs.
Sand et al., "Continuous Capture of Skin Deformation", ACM Transactions on Graphics, 22(3), pp. 578-586, 2003.
Scholkopf et al., "A Tutorial on support Vector Regression", In Technical Report NC2-TR-1998-030. NeuroCOLT2, 1998.
Seitz, et al., "A Comparison and Evaluation of Multi-View Stereo Reconstruction Algorithms", Computer Vision and Pattern Recognition, IEEE Computer Society Conference on, vol. 1. IEEE, 2006, 8 pages.
Sloan et al., "Shape by Example", In 2001 Symposium on Interactive 3D Graphics, pp. 135-144, 2001.
Smola et al., "A Tutorial on Support Vector Regression", Statistics and Computing London 14(3) pp. 199-222, 2004.
Sumner et al., "Deformation Transfer for Triangle Meshes", Proceedings of ACM SIGGRAPH 2004, 23(3), pp. 399-405, 2004.
Szleski et al., "Matching 3D Anatomical Surfaces with Non-rigid Deformations Using Octree-splines", International Journal of Computer Vision, 1996, 18(2), pp. 171-186, 1996.
Tao et al., "Mean Value Coordinates for Closed Triangular Meshes", Proceedings of ACM SIGGRAPH (2005), 6 pgs.
Taylor et al., "Modeling Human Motion Using Binary Latent Variables", Proc. of Advances in Neural Information Processing Systems (NIPS) vol. 19, 2006, 8 Pgs.
Tung et al., "Topology Matching for 3D Video Compression Computer Vision and Pattern Recognition", IEEE Conference Computer Vision and Pattern Recognition, 2007, Jun. 2007.
Vasilescu et al., "Multilinear Analysis of Image Ensembles: Tensorfaces", European Conference on Computer Vision (ECCV), pp. 447-460, May 2002.
Vlasic et al., "Face Transfer with Multilinear Models", ACM Transactions on Graphics 24(3), pp. 426-433, 2005.
Vlasic et al., "Multilinear Models for Facial Synthesis", SIGGRAPH Research Sketch, 1 pg., 2004.
Von Luxburg, "A Tutorial on Spectral Clustering. Statistics and Computing", 2007, 32 pgs.
Wang et al., "Multi-weight Enveloping: Least Squares Approximation Techniques for Skin Animation", ACM SIGGRAPH Symposium on Computer Animation, pp. 129-138, 2002.
Weise, et al., "Realtime performance-based facial animation", ACM Transactions on Graphics (TOG) 30.4 (2011): 77, 2011, 9 pages.
Wikipedia, "Morph target animation", Last Modified Aug. 1, 2014, Printed Jan. 16, 2015, 3 pgs.
Zhidong et al., "Control of motion in character animation", Jul. 14, 2004, pp. 841-848.
U.S. Appl. No. 12/370,269, filed Apr. 16, 2012, Office Action.
U.S. Appl. No. 12/370,269, filed Nov. 13, 2012, Office Action.
U.S. Appl. No. 12/370,269, filed Jul. 12, 2013, Office Action.
U.S. Appl. No. 12/370,269, filed Jan. 31, 2014, Notice of Allowance.
U.S. Appl. No. 12/753,032, filed Oct. 22, 2012, Office Action.
U.S. Appl. No. 12/753,032, filed May 31, 2013, Office Action.
U.S. Appl. No. 14/094,377, filed Oct. 3, 2014, Office Action.
U.S. Appl. No. 14/094,377, filed Mar. 6, 2015, Office Action.
U.S. Appl. No. 14/094,377, filed Sep. 4, 2015, Office Action.
U.S. Appl. No. 14/094,377, filed Dec. 31, 2015, Office Action.
Anguelov et al., "Recovering Articulated Object Models from 3D Range Data", In Proceedings of the 20th Conference on Uncertainty in Artificial Intelligence, pp. 18-26.
Anguelov et al., "The Correlated Correspondence Algorithm for Unsupervised Registration of Nonrigid Surfaces", In Conference on Computer Vision and Pattern Recognition (CVPR) pp. 77-84.
Max Planck Institut Informatik, "Automatic Conversion of Mesh Animations into Skeleton-based Animations", Retrieved at: http://www.mpiinf.mpg.de/-edeaguia/animation_eg08.html, Mar. 30, 2008, 9 Pgs.
U.S. Appl. No. 12/370,269, filed Apr. 16, 2016, Office Action.
U.S. Appl. No. 14/094,377, Mail Date May 18, 2016, Office Action.

\* cited by examiner

INTERACTIVE DESIGN, SYNTHESIS AND DELIVERY OF 3D MOTION DATA THROUGH THE WEB

RELATED APPLICATION

The current application is a continuation of U.S. application Ser. No. 12/370,269, filed Feb. 12, 2009, which claims priority to U.S. Provisional Application No. 61/192,779, filed Sep. 20, 2008, the disclosure of which is incorporated herein by reference.

FIELD OF THE INVENTION

The present invention relates generally to the generation of video animation and more specifically to the generation of animation using character motion data.

BACKGROUND

Three dimensional (3D) character animation has seen significant growth in terms of use and diffusion in the entertainment industry in the last decade. In most 3D computer animation systems, an animator defines a set of animation variables, or Avars that form a simplified representation of a 3D character's anatomy. The Avars are often organized in a hierarchical model and, therefore, the collection of Avars for a 3D character can be referred to as its hierarchical model. Motion of the 3D character can be defined by changing the values of Avars over time. The value of an Avar over time is referred to as the Avar's motion curve, and a sequence of motion can involve defining the motion curves for hundreds of Avars. The motion curves of all of a 3D character's Avars during a sequence of motion are collectively referred to as motion data.

An animator can directly animate a 3D character by manually defining the motion curves for the 3D character's Avars using an off-line software tool. Motion capture of a human or animal during a desired sequence of motion can also be used to generate motion data. Motion capture is a term used to describe a process of recording movement and translating the movement onto a digital model. A 3D character can be animated using the motion capture process to record the movement of points on the human or animal that correspond to the Avars of the 3D character during the motion. Motion capture has traditionally been performed by applying markers to the human or animal that can be mapped to the Avars of the 3D character. However, markerless techniques have recently been developed that enable the animation of 3D characters using mesh based techniques. Markerless motion capture using mesh based techniques is described in U.S. Patent Publication No. 2008/0031512 entitled "Markerless Motion Capture System" to Mundermann et al., the disclosure of which is incorporated by reference herein in its entirety.

Animating a 3D character manually or using motion capture can be time consuming and cumbersome. As discussed above, the manual definition of a character's motion can involve a laborious process of defining and modifying hundreds of motion curves until a desired motion sequence is obtained. Motion capture requires the use of complex equipment and actors. In the event that the captured motion is not exactly as desired, the animator is faced with the choice of repeating the motion capture process, which increases cost, or attempting to manually edit the motion curves until the desired motion is obtained, which is difficult. The inability of animators to rapidly and inexpensively obtain complex motion data for a 3D character can represent a bottleneck for the generation of 3D animations.

SUMMARY OF THE INVENTION

Systems and methods in accordance with embodiments of the invention enable the online interactive generation of synthetic motion data for 3D character animation. One embodiment of the invention includes a server system configured to communicate with a database containing motion data including repeated sequences of motion, where the differences between the repeated sequences of motion are described using at least one high level characteristic. In addition, the server system is connected to a communication network, the server system is configured to train a generative model using the motion data, the server system is configured to generate a user interface that is accessible via the communication network, the server system is configured to receive a high level description of a desired sequence of motion via the user interface, the server system is configured to use the generative model to generate synthetic motion data based on the high level description of the desired sequence of motion, and wherein the server system is configured to transmit a stream via the communication network including information that can be used to display a 3D character animated using the synthetic motion data.

In a further embodiment, the server system comprises an application server and a web server that are configured to communicate, the application server is configured to communicate with the database, the web server is connected to the communication network, the application server is configured to train the generative model using the motion data and provide the generative model to the web server, the web server is configured to generate the user interface that is accessible via the communication network, the web server is configured to receive the high level description of the desired sequence of motion via the user interface, the web server is configured to use the generative model to generate the synthetic motion data based on the high level description of the desired sequence of motion, and wherein the web server is configured to transmit the stream via the communication network including the information that can be used to display the 3D character using the synthetic motion data.

In another embodiment, the motion data includes actual motion data obtained via motion capture.

In a still further embodiment, the motion data is obtained via marker based motion capture.

In still another embodiment, the motion data includes meshes obtained using markerless motion capture.

In a yet further embodiment, the motion data includes manually generated motion data.

In yet another embodiment, the high level characteristic specifies the type of motion.

In a further embodiment again, the high level characteristic specifies a physical characteristic of the motion.

In another embodiment again, the high level characteristic specifies an expressive characteristic of the motion.

In a further additional embodiment, the server system is configured to train the generative model using supervised learning.

In another additional embodiment, the user interface provides the ability to describe the desired sequence of motion using the same types of high level characteristics as were used to describe differences between the repeated sequences of motion in the motion data.

In a still yet further embodiment, one of the high level characteristics is expressed as a value on a continuous scale.

In still yet another embodiment, the server system is configured to use the generative model to generate synthetic motion data from any description within the continuum of the scale of the high level characteristic.

In a still further embodiment again, the high level description of the desired sequence of motion includes at least a motion type, a trajectory for the motion, and at least one motion styling.

In still another embodiment again, the motion styling is a description of a physical characteristic or an expressive characteristic of the motion.

In a still further additional embodiment, the motion system is expressed as one of a number of discrete types of motion.

In still another additional embodiment, the trajectory of the motion is specified including at least a start point and an end point.

In a yet further embodiment again, the motion styling is expressed using a value from a continuous scale that corresponds to a high level characteristic that was used to describe differences between repeated sequences of motion in the motion data during the training of the generative model.

In yet another embodiment again, the server system is configured to receive an updated high level description of the desired sequence of motion over the communication network via the user interface, the server system is configured to use the generative model to generate a second set of synthetic motion data based on the updated high level description of the desired sequence of motion, and the server system is configured to transmit a stream via the communication network including information that can be used to display the 3D character animated using the second set of synthetic motion data.

A yet further additional embodiment also includes a user device connected to the communication network and configured using a browser application to display the user interface and to display the animated 3D character using the stream received from the server system.

In yet another additional embodiment, the motion data is based upon a standard model for a 3D character, the server system is configured to receive a model of a 3D character from the user device via the communication network, the server system is configured to retarget the synthetic motion data generated by the generative model based upon the high level description of the desired sequence of motion to animate the 3D character received from the user device, and the server system is configured to transmit a stream via the communication network including information that can be used to display the 3D character received from the user device animated using the synthetic motion data.

In a further additional embodiment again, the stream of the animated 3D character is generated by streaming the motion data to the user device, and the user device is configured to animate the 3D character using the received motion data.

In another additional embodiment again, the server system animates the 3D character using the synthetic motion data and streams the animated 3D character via the communication network for display.

Another further embodiment includes obtaining motion data from a storage device including sequences of repeated motion, where the motion data includes labels that describe high level characteristics of the repeated sequences of motion, building a generative model based on the motion data using supervised learning, defining initial motion characteristics for a desired motion sequence, generating synthetic motion data using the generative model based upon the initial motion characteristics, animating the 3D character using the synthetic motion data, and displaying the animated 3D character.

Still another further embodiment also includes modifying the initial motion characteristics to provide an edited high level description, generating a second set of synthetic motion data using the generative model based upon the edited high level description, animating the 3D character using the second set of synthetic motion data, and displaying the animated 3D character.

Yet another further embodiment includes filtering of the motion curves and joint angles using a low pass filter, removing the relative motion between the feet and the floor when foot contact is present using a model trained using machine learning techniques to identify situations in which the foot is expected to be locked, applying inverse kinematics correction to the motion of the feet, and reducing the number of keyframes on the motion curves.

Another further embodiment again includes obtaining a user model of the 3D character, determining a mapping from the training model to the user model of the 3D character, defining initial motion characteristics for a desired motion sequence, generating synthetic motion data using the generative model based upon the initial motion characteristics, retargeting the synthetic motion data generated by the generative model to animate the user model of the 3D character, and displaying the animated 3D character.

DETAILED DESCRIPTION OF THE INVENTION

Turning now to the drawings, animation systems and methods for real time interactive generation of synthetic motion data for the animation of 3D characters are illustrated. The term synthetic motion data describes motion data that is generated by a machine. Synthetic motion data is distinct from manually generated motion data, where a human animator defines the motion curve of each Avar, and actual motion data obtained via motion capture. Animation systems in accordance with many embodiments of the invention are configured to obtain a high level description of a desired motion sequence from an animator and use the high level description to generate synthetic motion data corresponding to the desired motion sequence. Instead of directly editing the motion data, the animator can edit the high level description until synthetic motion data is generated that meets the animator's needs. In several embodiments, a generative model is used to generate synthetic motion data based upon a high level description of a desired motion sequence. In a number of embodiments, the generative model is a statistical model that is obtained using supervised learning. Supervised learning involves training a statistical model using motion data for a number of sequences of motion, which can be referred to as training sequences. The training is supervised, because each training sequence is described using a high level description. In this way, the statistical model builds relationships between high level descriptions and actual motion data. Once a generative model has been created, synthetic motion data can be generated by providing the generative model with a high level description indicative of a desired sequence of motion. In a number of embodiments, the high level description represents one or more expressive characteristics of the motion as values on a continuous scale and, when provided with a sufficient number of training sequences from throughout the scale, the generative model can produce synthetic motion data anywhere on the continuum and that is potentially unlike any of the motion sequences observed during training.

Animation System

Figure 1:
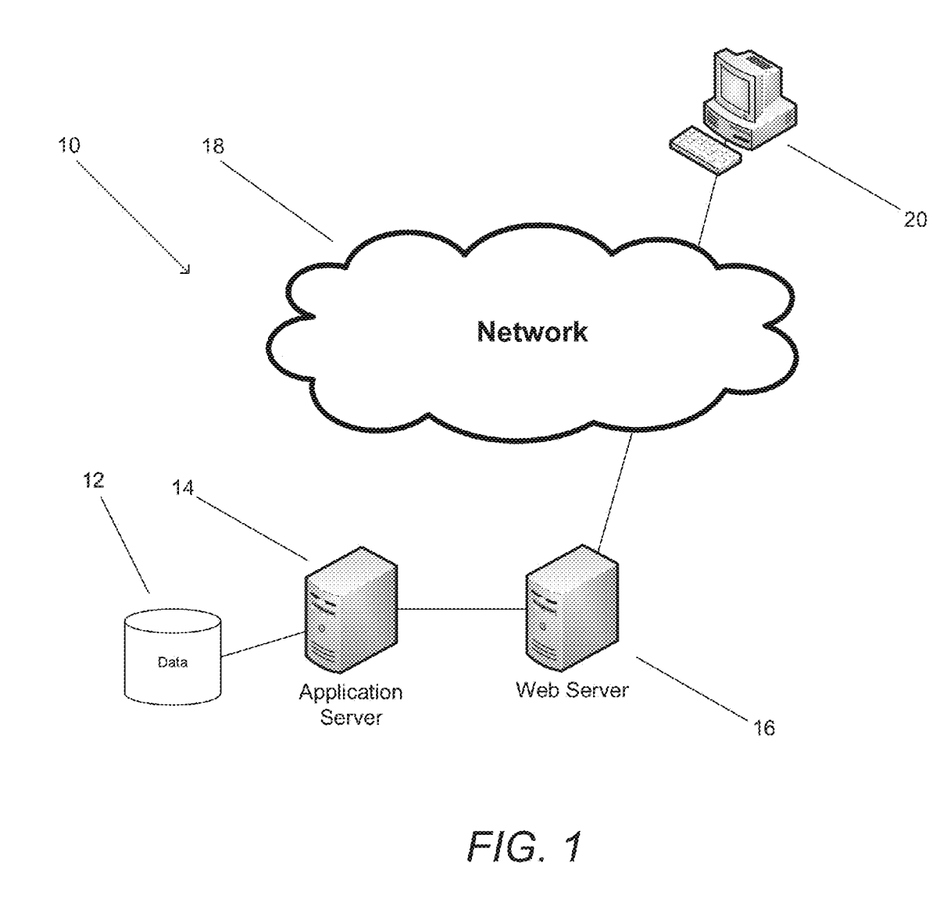
FIG. 1 is a semi-schematic diagram of an animation system configured to generate synthetic motion data in accordance with an embodiment of the invention.

An animation system that can generate synthetic motion data in accordance with an embodiment of the invention is shown in FIG. 1. The animation system 10 includes a storage device 12 connected to server system, which in the illustrated embodiment includes an application server 14 connected to a web server 16. The web server is connected to the Internet 18 and a number of user devices 20 can access the web server via the Internet using a browser application.

The storage device contains motion data that is used by the application server to create a generative model. A generative model is a model that can generate synthetic motion data corresponding to a high level description of desired motion characteristics. In a number of embodiments, the generative model is a statistical model that is built by the application server using supervised learning. Supervised learning is a training process where each training sequence is described by a high level description. During training, the statistical model forms associations between the high level characteristics of the motion and the underlying motion data. Therefore, a generative model is obtained that can produce realistic synthetic motion data based upon a high level description of the desired motion. In general, the performance of the generative model in generating desired synthetic motion data is improved by using motion data during training that includes multiple repetitions of the same sequence of motion and using the high level characteristics to explain the differences between each repetition. In several embodiments, supervised learning is used to train a Continuous Restricted Boltzmann Machine (CRBM) that can then be used as a generative model. Training of a CRBM using motion data is an extension of the method described in the conference paper by Taylor et al. entitled "modeling Human Motion Using Binary Latent Variables" presented at the Twentieth Annual Conference on Neural Information Processing Systems in Whistler, Canada (available at http://www.cs.toronto.edu/~gwtaylor/), the disclosure of which is incorporated by reference herein in its entirety. In other embodiments, any of a variety of statistical models that can be trained using supervised learning to form a generative model, which can generate synthetic motion data from a high level description of desired motion can be used.

A high level description of motion can take any of a number of different forms appropriate to the application. In many embodiments, each training sequence is described using a common set of arbitrary characteristics. The arbitrary characteristics can relate to any aspect of the motion from a simple descriptor of the type of motion (e.g., running or walking) to a complex expressive quality of the motion (e.g., happiness, tiredness, urgency, or intoxication). The term expressive quality is used herein to describe aspects of motion that communicate information about a character and/or the character's state of being. When a generative model is trained using a sufficiently large number of training sequences labeled to reflect the expressive qualities of the training sequences, the generative model can be used to generate synthetic motion data possessing specific expressive qualities. In a number of embodiments, simple characteristics of motion such as a type of motion are expressed by labeling each training sequence with one of a number of discrete values. In several embodiments, complex characteristics of motion such as the extent of a specific expressive quality (i.e., the extent to which the motion conveys a particular idea or emotion) or a physical characteristic of the motion (e.g., walking speed, height and/or distance of a jump) are expressed by assigning each training sequence with a score on a continuous scale. When a high level characteristic is expressed on a continuous scale, the generative model can be used to generate synthetic motion data anywhere on the continuum.

Once a generative model has been trained, the application server deploys the generative model to the web server, which can use the generative model to create synthetic motion data from a high level description. In the illustrated embodiment, the web server creates a web based user interface that can be accessed via a user device configured with an appropriate browser application. The web based user interface enables an animator to provide a high level description of desired motion, which is typically in terms of the arbitrary characteristics used in the training of the generative model. The web server uses the high level description to generate synthetic motion data in real time that can animate a 3D character. The animation can be streamed to the animator's browser in real time enabling the animator to determine whether the synthetic motion data produces a desired animation sequence. Alternatively, the motion data (e.g., curves and/or joint angles) can be compressed and streamed to the user device and used by a client application on the user device to animate the 3D character. Such client application could be a video game, a browser plug-in, or a third party software application. In the event that the animator wishes to edit the sequence of motion, the animator can modify the high level description originally provided to the web server via the user interface and the application server can generate a new set of synthetic motion data in response to the new high level description. The editing process is analogous to providing modified directions to an actor and reshooting a motion capture sequence. However, the use of a generative model can eliminate the need for an actor and motion capture equipment during the editing process. Use of a generative model can also provide the animator with greater control over the final motion data.

Provision of a generative model in a distributed architecture in accordance with embodiments of the invention enables efficient use of motion capture data. Instead of each animator separately performing motion capture for each 3D character, a large bank of motion capture data can be built over time and then the same motion capture data can be used by multiple animators via generative models. Despite the likelihood that the bank of motion capture data does not contain the specific sequence of motion desired by the animator, the generative model enables the generation of synthetic motion data matching the high level description of the desired motion provided by the animator and unlike any sequence in the bank of motion capture data. Therefore, much of the efficiency is obtained by providing multiple animators with access to the same system for generating synthetic motion and by providing a system that is capable of generating synthetic motion and not simply retrieving motion sequences from a library.

Although a specific architecture is shown in FIG. 1, a number of animation systems in accordance with embodiments of the invention are implemented using a single server, using additional servers, as off-line software packages that include one or more previously trained generative models and/or provide the ability to download one or more generative model. In addition, the functions performed by different aspects of the system can vary. For example, embodiments of the invention could utilize a web server that generates a user interface and performs the generation of synthetic motion data using a generative model. Furthermore, the specific architecture shown in FIG. 1 is not essential to the delivery of motion data to a remote user. In a number of embodiments, the animation system is implemented using any of a variety of architectures for providing remote access to a system capable of generating synthetic motion data using a generative model including an architecture based around the use of cloud computing.

Generating Synthetic Motion Using a Generative Model

Figure 2:
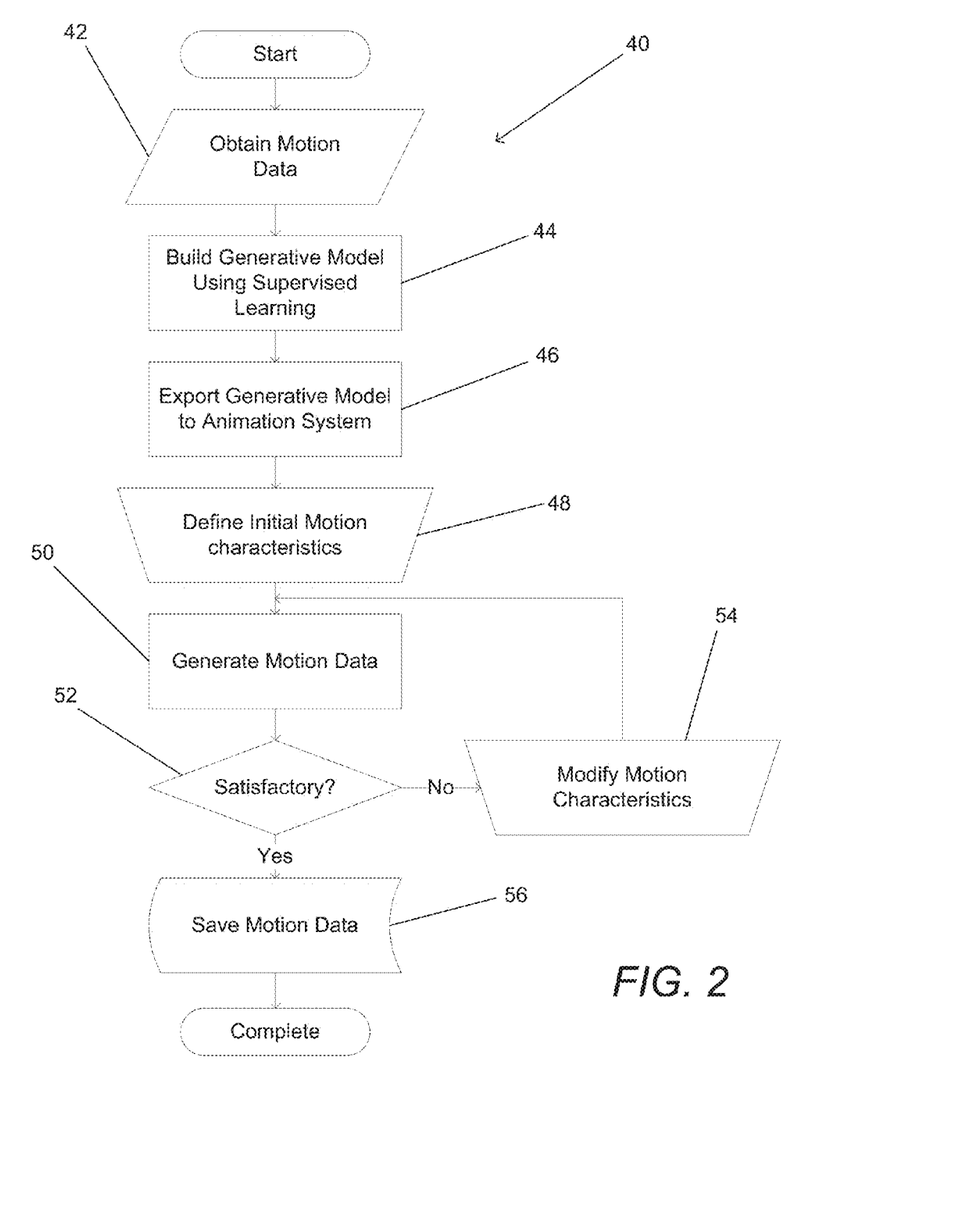
FIG. 2 is a flow chart illustrating a process for generating synthetic motion data in accordance with an embodiment of the invention.

A process for generating synthetic motion data for animating a 3D character using a generative model in accordance with an embodiment of the invention is shown in FIG. 2. The process 40 includes obtaining (42) motion data to use in the training of a generative model. The motion data can be actual motion data obtained via motion capture (either marker based or markerless), or can be synthetic motion created manually by an animator using a conventional off-line animation software application. For the motion data to be used in the training of the generative model, each sequence of motion data is described using a set of high level characteristics appropriate to the application. The motion data is then used to build (44) a generative model using supervised learning. As discussed above, any model appropriate to the application that is capable of generating synthetic motion data from a high level description of a desired motion sequence can be used. An initial set of high level motion characteristics is then defined (48) and the generative model generates (50) synthetic motion data based upon the high level motion characteristics. The motion data is presented to the animator and a determination (52) is made concerning whether the synthetic motion data is satisfactory. In the event that the synthetic motion data does not animate the 3D character in the manner desired by the animator, the high level description of the desired motion can be modified (54) and the modified description used by the generative model to generate new synthetic motion data. When the animator is satisfied with the manner in which the generated synthetic motion data animates the 3D character, the synthetic motion data can be downloaded for storage by the animator and/or stored in a user account.

Although a specific process for generating synthetic motion data in accordance with an embodiment of the invention is illustrated in FIG. 2, other embodiments that enable the editing of a high level description of desired motion in order to produce synthetic motion data can also be used.

Building an Animation Sequence

Animation systems in accordance with embodiments of the invention support the animation of user defined models of 3D characters (User Model). The animation typically involves building a generative model using a first model, a so-called Standard Model, and then determining how the Standard Model maps to a User Model. When hierarchical models are used as both the Standard Model and the User Model, the mapping includes determining the relationships between Avars in each hierarchical model. In this way, variations in the proportions and shape of a User Model compared to a Standard Model used during the training of the generative model can be accommodated without the need to train a new generative model using the User Model for which training sequences may not be available.

Figure 3:
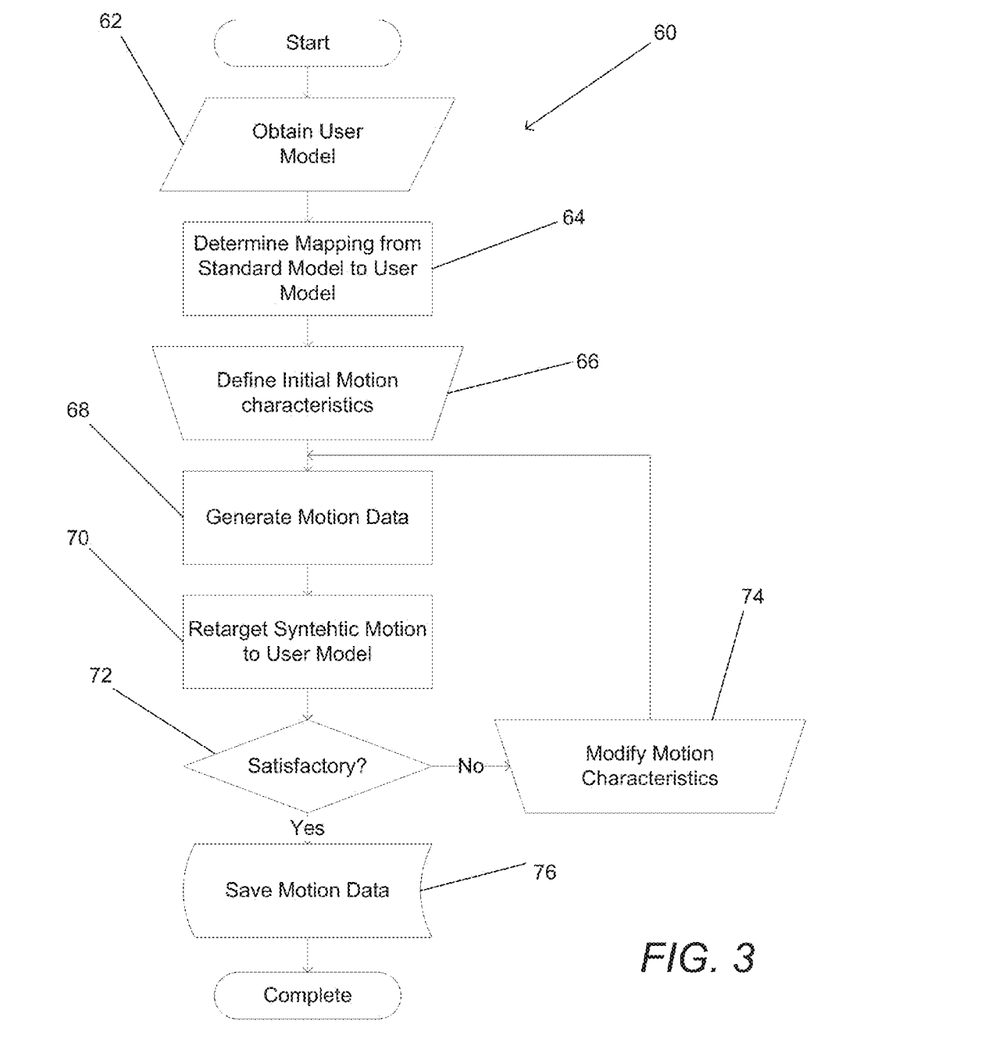
FIG. 3 is a flow chart illustrating a process for generating synthetic motion data and retargeting the data to animate a user defined 3D character in accordance with an embodiment of the invention.

A process for generating synthetic motion data to animate a user defined 3D character in accordance with an embodiment of the invention is illustrated in FIG. 3. The process 60 includes obtaining (62) a User Model. In web based systems, the User Model can be uploaded to a web server in a standard file format. Once the User Model is obtained, the User Model can be compared to the Standard Model used during the training of the generative model. Through careful comparison, mappings of the motion data of the Standard Model to the User Model can be determined. The animator can then provide (66) an initial high level description of a motion sequence, which the generative model can use to generate synthetic motion data. The generative model generates motion data suitable for animation the Standard Model. Therefore, a retargeting process is applied to the synthetic motion data to provide synthetic motion data that is suitable for animating the User Model. In many embodiments, the animation is displayed to the animator in real time by streaming the animation directly or the motion data to a client application via the Internet. The animator can determined (72) whether additional modifications (74) to the high level description are required to obtain the desired motion or whether to save (76) the final motion data.

Although a specific process is illustrated in FIG. 3, other processes in accordance with embodiments of the invention can be used that enable the retargeting of synthetic motion data generated by a generative model to animate a User Model.

Specifying Desired Motion

Figure 4:
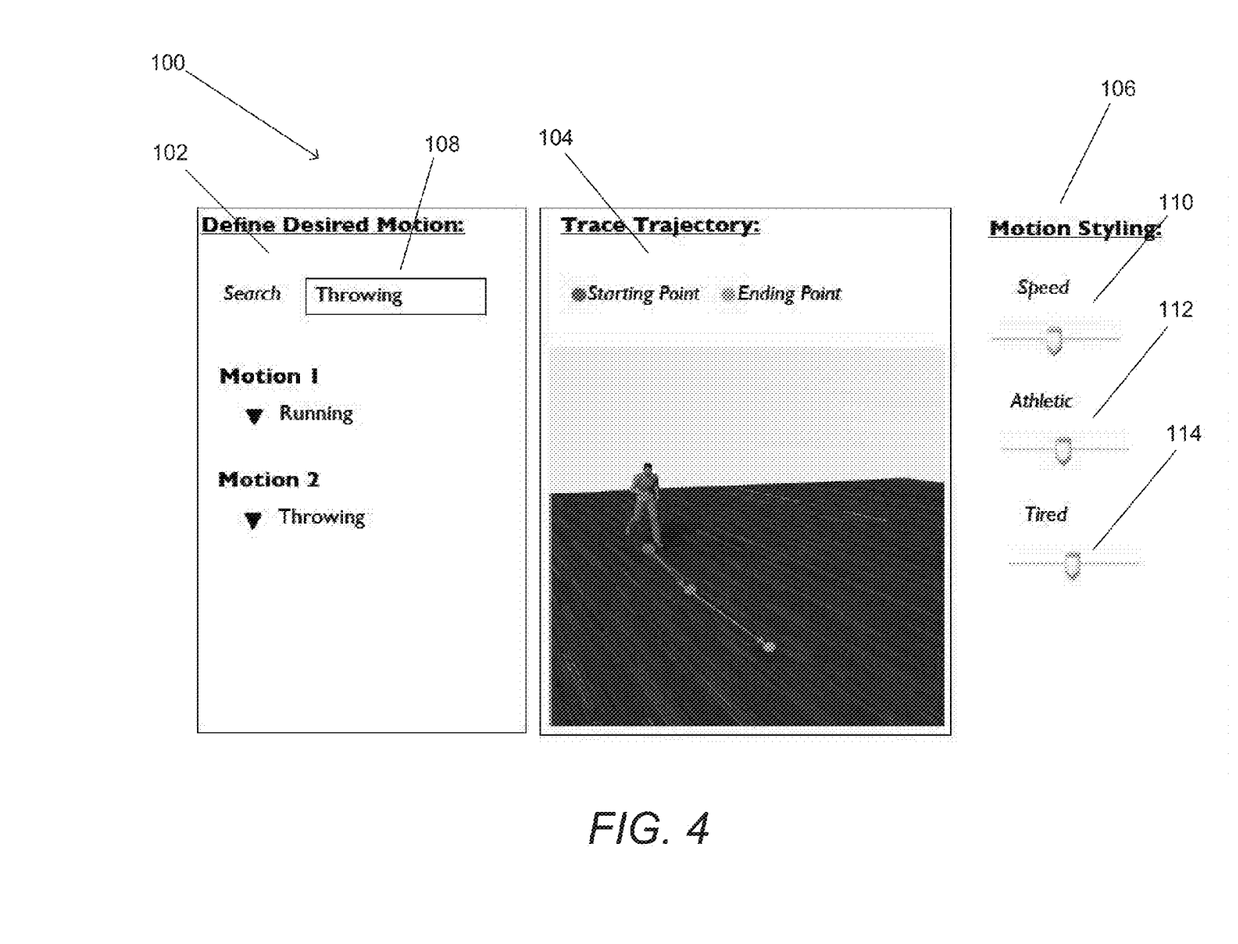
FIG. 4 is a conceptual illustration of a user interface for obtaining a high level description of a desired sequence of motion in accordance with an embodiment of the invention.

Once a model for a 3D character has been selected (either a User Model or the Standard Model), systems in accordance with embodiments of the invention enable the animation of the model of the 3D character using a high level description of the desired motion. As discussed above, a variety of characteristics of the motion including the physical characteristics of the motion and the expressive characteristics of the motion can be controlled via a user interface. A user interface that can be used to obtain a high level description of a sequence of motion from an animator in accordance with an embodiment of the invention is shown in FIG. 4. The conceptual illustration of the user interface 100 includes three different panels that enable the definition of the motion in three stages. The first panel 102 enables the user to define a sequence of discrete types of motion. In the illustrated embodiment, the sequence involves "running" followed by "throwing". The specific motions can be selected using any of a variety of common techniques for building user interfaces. For example, a user can select options from a pull down list or search for a specific motion by entering a search term in a dialog box 108. In a number of embodiments, a single generative model is capable of multiple different types of motion by providing the type of motion to the generative model. In several embodiments, a different generative model is used to generate synthetic motion data for each type of motion. In many embodiments, additional generative models are used to generate motion data for the transitions between different types of motion. The second panel 104 enables the user to define the trajectory of each different specified type of motion. Where appropriate, a number of embodiments of the invention enable the animator to specify a landscape. The animator can then define the starting point and the ending point of each type of motion. In a number of embodiments, the animator can also define the transition. In the illustrated embodiment, the user interface enables the definition of the starting and end points of each motion using a drag and drop interface. The third panel 106 enables the definition of additional physical and/or expressive characteristics of the motion, which can also be referred to as the motion styling. In the illustrated embodiment, the user interface includes three sliders that enable the description of the desired speed of the motion (110), a description of the athleticism to be expressed by the motion of the 3D character (112), and a description of the level of fatigue to be expressed by the motion of the 3D character (114). In other embodiments, any of a variety of high level characteristics specified during the training of the generative model can be controlled via the user interface. Once the animator has completed describing the characteristics of the motion using the user interface, the animation system uses one or more generative models to generate synthetic motion data corresponding to the described motion. In the illustrated embodiment, the animation of the 3D character using the synthetic motion data is presented in the second panel 104. The animator can review the animation, modify the sequence of motions, the trajectory of each motion and/or the lengths of transitions and modify the values of the styling characteristics until the sequence is satisfactory. At which point, the animator can obtain the synthetic motion data in a standard format.

Although a specific user interface is illustrated in FIG. 4, any user interface that enables the specification of the trajectory and styling of motion can be used in accordance with embodiments of the invention to obtain a high level description of desired motion from an animator.

Improving the Quality of Synthetic Character Motion Data

In a number of embodiments, synthetic motion data including motion curves and joint angles can be improved by applying filtering processes and reducing the number of key frames (i.e., complete frames). In several embodiments, motion data is filtered using a low pass filter with a frequency that is appropriate for the desired level of smoothing of the motion curves and joint angles. In addition, relative motion between a character's feet and a surface such as a floor when foot contact is present can be removed. In many embodiments, the relative motion is removed using machine learning techniques (e.g., Support Vector Machines) to learn the situations in which the foot is expected to be locked during motion. The relative motion can be eliminated by applying an inverse kinematics correction to the motion of the feet. The editing of the motion data can be facilitated by reducing the number of keyframes on the motion curves. Although specific processes are outlined above for improving the quality of synthetic motion data, many filters and adjustments can be made in accordance with embodiments of the invention to achieve enhancements to generated character motion data as appropriate to a specific character and/or application.

Although the present invention has been described in certain specific aspects, many additional modifications and variations would be apparent to those skilled in the art. It is therefore to be understood that the present invention may be practiced otherwise than specifically described, including various changes in the implementation such as using supervised learning to train a generative model based upon meshes as opposed to markers. Thus, embodiments of the present invention should be considered in all respects as illustrative and not restrictive.

What is claimed is:

1. An animation system for designing, synthesizing, and delivering three-dimensional character motion data, comprising:
   at least one processor; and
   at least one non-transitory computer readable storage medium storing instructions that, when executed by the at least one processor, cause the system to:
   access, a database containing motion data including repeated sequences of motion, wherein the repeated sequences of motion are distinguishable by at least one high level characteristic;
   generate a user interface accessible via the communication network that provides high level descriptions of animations compatible with a three-dimensional character;
   receive, via the user interface, a selection of a desired sequence of motion;
   train a generative model based on motion data for the desired sequence of motion;
   receive a selection of a high level description for the desired sequence of motion via the user interface for the three-dimensional character;
   generate synthetic motion data based on the trained generative model and the selected high level description for the desired sequence of motion; and
   transmit the synthetic motion data in a stream, via a communication network, such that the motion data can be used to animate the three-dimensional character.

2. The animation system of claim 1, wherein the motion data includes actual motion data obtained via motion capture.

3. The animation system of claim 2, wherein the motion data is obtained via marker based motion capture.

4. The animation system of claim 2, wherein the motion data includes meshes obtained using markerless motion capture.

5. The animation system of claim 1, wherein the motion data includes manually generated motion data.

6. The animation system of claim 1, wherein the high level characteristic specifies the type of motion.

7. The animation system of claim 1, wherein the high level characteristic specifies a physical characteristic of the motion.

8. The animation system of claim 1, wherein the high level characteristic specifies an expressive characteristic of the motion.

9. The animation system of claim 1, wherein the instructions, when executed by the at least one processor, cause the system to train the generative model using supervised learning.

10. A method for designing, synthesizing, and delivering three-dimensional character motion data, comprising:
    accessing, a database containing motion data including repeated sequences of motion, wherein the repeated sequences of motion are distinguishable by at least one high level characteristic;
    generating, by at least one processor, a user interface accessible via the communication network that provides high level descriptions of animations compatible with a three-dimensional character;
    receiving, via the user interface, a desired sequence of motion;
    training a generative model based on motion data for the desired sequence of motion;
    receiving a selection of a high level description for the desired sequences of motion via the user interface for the three-dimensional character;
    generating synthetic motion data based on the trained generative model and the selected high level description for the desired sequence of motion; and
    transmitting the synthetic motion data in a stream, via a communication network, such that the motion data can be used to animate the three-dimensional character.

11. The method of claim 10, wherein one of the high level characteristics is expressed as a value on a continuous scale.

12. The method of claim 11, further comprising using the generative model to generate synthetic motion data from any description within the continuum of the scale of the high level characteristic.

13. The method of claim 10, wherein the high level description of the desired sequence of motion includes at least a motion type, a trajectory for the motion, and at least one motion styling.

14. The method of claim 13, wherein the motion styling is a description of a physical characteristic or an expressive characteristic of the motion.

15. The method of claim 13, wherein the motion system is expressed as one of a number of discrete types of motion.

16. The method of claim 13, wherein the trajectory of the motion is specified including at least a start point and an end point.

17. The method of claim 13, wherein the motion styling is expressed using a value from a continuous scale that corresponds to a high level characteristic that was used to describe differences between the repeated sequences of motion in the motion data during the training of the generative model.

18. The method of claim 10, further comprising:
receiving an updated selection of the high level description for the desired sequence of motion via the user interface for the three-dimensional character;
generating updated synthetic motion data based on the trained generative model and the updated high level description for the desired sequence of motion; and
transmitting the updated motion data in the stream via the communication network.

19. The method of claim 10, further comprising retargeting the synthetic motion data to the three-dimensional character.

20. The method of claim 10, wherein synthetic motion data is transmitted in the stream to a client device such that the motion data can be used to animate the three-dimensional character on the client device.

21. The method of claim 10, further comprising receiving information corresponding to the three-dimensional character.

\* \* \* \* \*